United States Patent [19]

Tollefson

[11] Patent Number: 4,813,628
[45] Date of Patent: Mar. 21, 1989

[54] SLACK LIMITER FOR A MAGNETIC TAPE CASSETTE

[75] Inventor: Dale T. Tollefson, Woodbury, Minn.

[73] Assignee: Minnesota Mining and Manufacturing Company, St. Paul, Minn.

[21] Appl. No.: 56,444

[22] Filed: Jun. 1, 1987

[51] Int. Cl.⁴ .......................................... G11B 23/087
[52] U.S. Cl. .................................................... 242/199
[58] Field of Search ................................. 242/197–200, 242/76; 360/132; 226/196, 197, 199

[56] References Cited

U.S. PATENT DOCUMENTS

| 4,304,374 | 12/1981 | Okamura et al. | 242/199 |
| 4,405,097 | 9/1983 | Gebeke | 242/199 |
| 4,417,704 | 11/1983 | Oishi et al. | 242/197 |
| 4,518,135 | 5/1985 | Gebeke | 242/199 |
| 4,544,976 | 10/1985 | Oishi et al. | 242/199 X |
| 4,620,255 | 10/1986 | Cook et al. | 242/199 X |

Primary Examiner—David Werner
Attorney, Agent, or Firm—Donald M. Sell; Walter N. Kirn; David W. Anderson

[57] ABSTRACT

A slack limiter for a tape cassette which is tubular in cross-section and mounted to engage and bias a tape against a support surface and prevent slack or looseness of the tape.

7 Claims, 2 Drawing Sheets

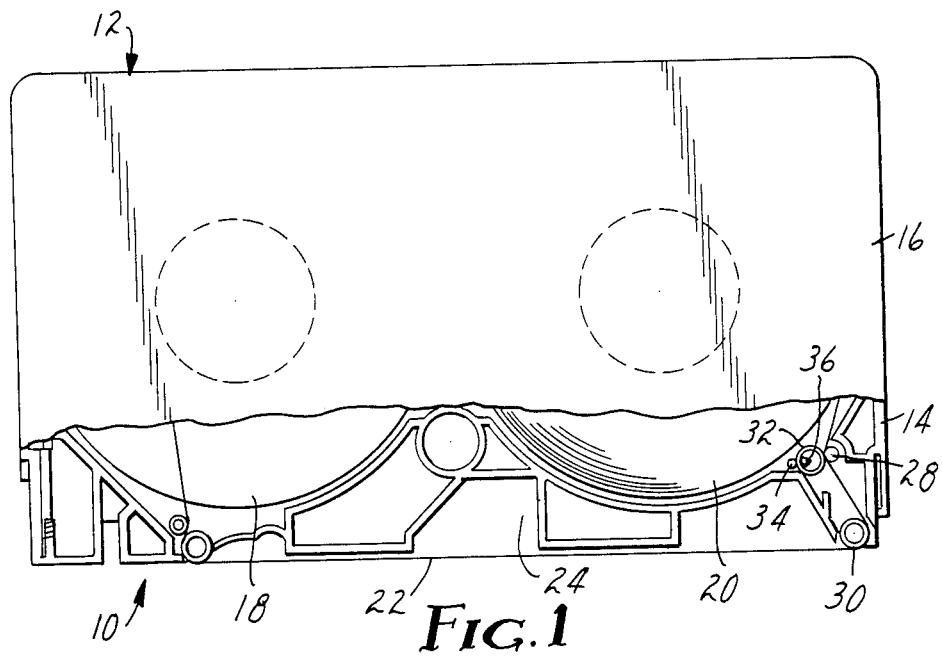
FIG. 1
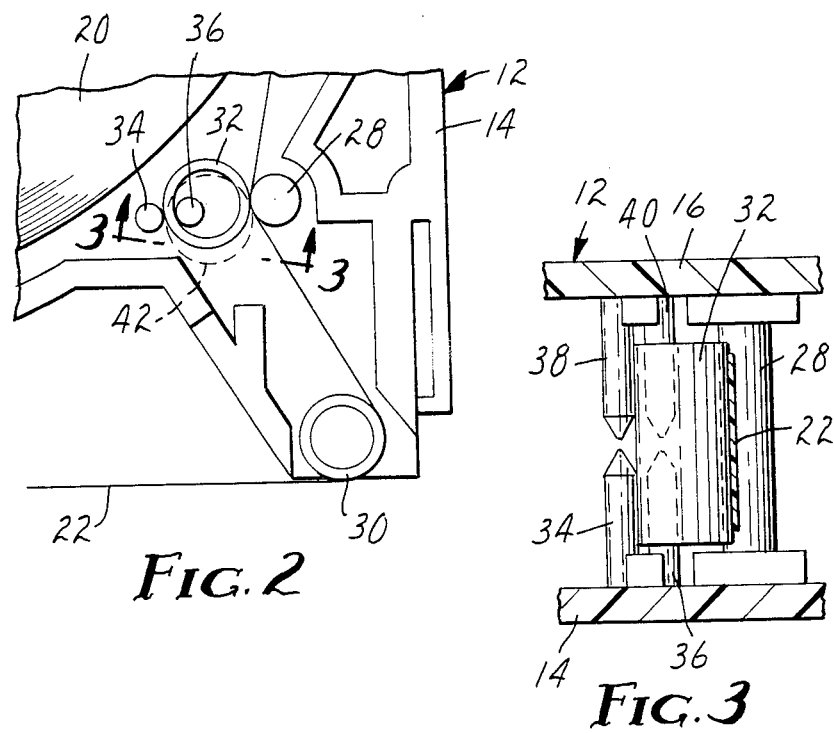
FIG. 2
FIG. 3

SLACK LIMITER FOR A MAGNETIC TAPE CASSETTE

BACKGROUND OF THE INVENTION

1. Field of the Invention

The present invention relates generally to cassettes of the type including a length of magnetic tape wound around at least one reel rotatably mounted in a housing, with a portion of the tape extending to the exterior of the cassette for engagement by a recording and/or reproducing device and, in particular, a slack limiter for frictionally engaging the tape and limiting looseness or slack in the portion of the tape extending exteriorly of the cassette.

2. Description of the Prior Art

In cassettes including at least one reel of tape for data recording, slack or looseness can arise when the cassette is being transported or is otherwise separated from its associated recording and/or reproducing device (hereinafter recorder). While some cassettes have locks which restrict rotation of the reel or reels when the cassette is not in the recorder, it is still possible that one or both of the reels, if the cassette is furnished with two reels, within the cassette housing may turn to unwind tape and develop slack in the portion of the tape extending from the reel. Slack in the tape can also occur when the tape is engaged with the recorder. Typically, the recorder has a spindle or spindles which engage the tape reel or reels. If the cassette has two reels and driving and braking of the reels during operation of the recorder is not synchronous, slack in the tape will develop. This slack may cause the tape to jam within the cassette housing or within the recorder and may lead to defective recording or reproducing operations.

So-called slack limiters for avoiding such slack or looseness of the magnetic tape have been disclosed in U.S. Pat. Nos. 4,304,374; 4,405,097; 4,417,704 and 4,518,135 in which the slack limiters described commonly include a resilient, flexible strip, usually of plastic, affixed at one end to the cassette housing and having a free end to which is adhesively affixed a layer of low friction material such as polytetrafluoroethylene (Teflon). The free end of the slack limiter presses the magnetic tape against a stationary portion of the cassette housing and thus frictionally prevents the tape from unwinding from the reel and developing slack.

The foregoing patents are distinguished by the manner in which the slack limiter is attached to the cassette housing. Although slack limiters such as those described in the above patents have generally performed satisfactorily, the potential for a number of problems exists. The slack limiter may become detached from its mounting, particularly if the slack limiter is adhesively mounted, and may fall from or within the cassette housing. Additionally, the adhesive securing the Teflon coating to the slack limiter may deteriorate or fail allowing Teflon or adhesive pieces to be present within the cassette housing.

SUMMARY OF THE INVENTION

The present invention provides an improved cassette slack limiter which is economically manufactured, which can be rapidly installed and properly positioned within the cassette and which eliminates or greatly reduces the possibility of the slack limiter or a portion thereof becoming detached from its mounting after installation.

More particularly, the slack limiter of the present invention is a polymeric tube, preferably cylindrical, which engages the tape and biases the tape against a fixed support. The tubular slack limiter is mounted to the housing by means of two parallel pins spaced to accept and retain a portion of the tube. The pins are preferably formed of pointed halves molded as part of the cassette halves to facilitate assembly of the tubular slack limiter to the cassette.

BRIEF DESCRIPTION OF THE DRAWINGS

The present invention will be more thoroughly described with reference to the accompanying drawings, wherein like numbers refer to like parts in the several views, and wherein:

FIG. 1 is a plan view of a cassette having parts broken away to show details including the tubular slack limiter of the present invention;

FIG. 2 is an enlarged plan view of the lower right-hand portion of the cassette of FIG. 1;

FIG. 3 is a partial, elevational, cross-sectional view taken generally along the line 3—3 of FIG. 2.

DESCRIPTION OF THE PREFERRED EMBODIMENT

Figure 4:
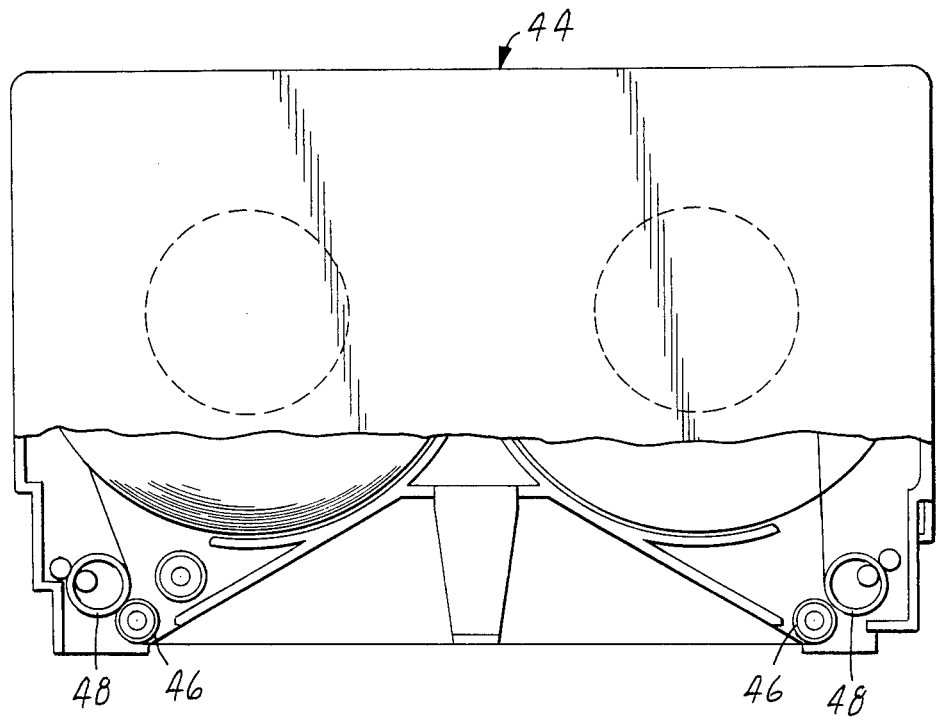
FIG. 4 is a plan view of a second embodiment of a cassette having parts broken away to show details including the slack limiter of the present invention.

Referring to FIG. 1 of the drawings, there is illustrated a cassette 10 which comprises a housing 12 including a lower molded sidewall assembly 14 and a mating upper molded sidewall assembly 16, two reels 18 and 20 rotatably mounted between the sidewall assemblies 14 and 16, and a length of tape 22 having opposite end portions extending therebetween. The molded sidewall assemblies 14 and 16 define a tape access area 24 along the outer surface of the housing 12 which is covered by a door (not shown) when the cassette 10 is not in use. The door is pivoted open by a video tape recorder in which the cassette 10 is mounted to afford access to the tape 22 extending across the access area 24. Guide means including two cylindrical guide pins 28 and 30 direct the portion of the tape 22 between the reels 18 and 20 along a tortuous path to the access area 24.

As best seen in FIGS. 2 and 3, a tubular slack limiter 32 is positioned adjacent the guide 28 to bias the tape 22 into engagement with the guide 28. The slack limiter 32 is mounted to the cassette 10 by means of two spaced and parallel pins 34 and 36 extending from the lower sidewall 14 and two coaxial pins 38 and 40 extending from the upper sidewall 16. The pins 34–40 may be alternately formed as two pins extending entirely from one of the upper 16 or lower 14 sidewalls but are preferably formed as shown in FIG. 3 to facilitate assembly. The pointed pins 34 and 36 allow the tubular slack limiter 32 to be automatically positioned with respect to the lower sidewall assembly 14 and the pointed pins 38 and 40 allow the upper sidewall assembly 16 to be assembled to the lower sidewall assembly 14 and automatically capture the slack limiter 32. The pins 34–40 capture a portion of the slack limiter 32 and are spaced so as to allow a slight rotation of the slack limiter 32 as indicated by the phantom lines 42 in FIG. 2. In this way the slack limiter 32 can move from one side of the guide pin 28 to the other, depending upon the direction of movement of the tape 22. The pins 34-40 could be spaced closer and/or shaped differently to rigidly hold the slack limiter 32 in position with respect to the guide 28, but such an arrangement may result in excessive pressure of the slack limiter against the tape 22 and undue friction generated between the slack limiter 32 and the tape 22 during high-speed movement of the tape 22. The allowance of limited oscillating movement of the slack limiter 32 is preferably to produce low but adequate friction between the slack limiter 32 and the tape 22.

The slack limiter is preferably a cylindrical tube, but may have any other cross-sectional shape which would be effective, such as oval. The slack limiter 32 may be of any material which has a low coefficient of friction, is abrasion resistant and which has sufficient resiliency to produce a biasing force which urges the tape 22 against the guide 28. Preferred materials for the slack limiter 32 include polytetrafluoroethylene (Teflon), ultra-high molecular weight polyethylene and medium density polyethylene.

FIGS. 1-3 illustrate a VHS cassette which utilizes a half-inch magnetic tape and which includes two reels 18 and 20 within the housing 12. Preferred dimensions for the slack limiter 32 used in conjunction with such a cassette 10 are a 4.75 mm inner diameter with a 0.25 mm wall and a 1.27 mm length. The pins 34-40 are preferably 2.00 mm in diameter with a center-to-center spacing of 2.50 mm. The distance between the closest approach of the pins 36 and 40 to the guide pin 28 is preferably 3.05 mm.

FIG. 4 illustrates a Beta format cassette 44 which includes only one guide 46 in each corner of the cassette 44 rather than the two guides 28 and 30 present in the VHS cassette 10. FIG. 4 merely illustrates that a slack limiter 48 of the present invention may be adapted to a variety of tape cassettes, so long as a support surface is available against which the slack limiter 48 may bear.

Although the present invention has been described with respect to a limited number of embodiments, it is understood that many modifications will be apparent to those skilled in the art. Particularly, although the present invention has been described with respect to cassettes having two reels and used in video tape recording, the present invention is completely applicable to other cassettes, such as Phillips audio cassettes and cassettes having less than two reels, such as eight-track audio cassettes. All modifications falling within the spirit and scope of the appended claims are intended to be included in the invention.

I claim:

1. In a tape cassette including a housing having an access opening, at least one reel rotatably mounted within the housing, a length of tape wound around the reel and extending across the access opening for movement between the reel and the access opening along a tape path, and a support surface along the tape path, the improvement comprising:
   a tubular slack limiter adapted to engage said tape and bias said tape transversely to the direction of tape movement and against said support surface; and
   two parallel pins extending from the interior of said housing for supporting the longitudinal axis of said slack limiter substantially parallel to said tape and substantially perpendicular to the direction of tape movement, said pins being spaced a distance from each other greater than the thickness of said tubular slack limiter and sufficient to allow said slack limiter to rotate with respect to said pins and move with respect to said support surface in the direction of tape movement.

2. An improved tape cassette according to claim 1 wherein said housing is split perpendicular to said pins to form two halves and said pins are defined by coaxial extensions extending from each housing half.

3. An improved tape cassette according to claim 2 wherein said extensions defining said pins are pointed to prevent interference between said extensions and said slack limiter when said housing halves are assembled.

4. An improved tape cassette according to claim 1 wherein said slack limiter is a cylindrical tube.

5. An improved tape cassette according to claim 1 wherein said slack limiter is polytetrafluoroethylene.

6. An improved tape cassette according to claim 1 wherein said slack limiter is polyethylene.

7. An improved tape cassette according to claim 1 wherein said support surface is a third pin parallel to said two pins and said spacing of said two pins is sufficient to allow said slack limiter to move from one side of said third pin to the other in response to a change in direction of tape movement.

* * * * *